(12) United States Patent
Okubo

(10) Patent No.: US 9,013,597 B2
(45) Date of Patent: Apr. 21, 2015

(54) IMAGE PICKUP APPARATUS THAT CARRIES OUT NOISE COMPENSATION, CONTROL METHOD THEREFOR, AND STORAGE MEDIUM

(75) Inventor: Toshiyuki Okubo, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 33 days.

(21) Appl. No.: 13/554,420

(22) Filed: Jul. 20, 2012

(65) Prior Publication Data

US 2013/0050538 A1 Feb. 28, 2013

(30) Foreign Application Priority Data

Aug. 26, 2011 (JP) .................. 2011-184758

(51) Int. Cl.
*H04N 5/225* (2006.01)
*H04N 5/235* (2006.01)
*G06T 5/00* (2006.01)
*G06T 5/50* (2006.01)

(52) U.S. Cl.
CPC .............. *H04N 5/2355* (2013.01); *G06T 5/002* (2013.01); *G06T 5/50* (2013.01); *G06T 2200/21* (2013.01); *G06T 2207/10016* (2013.01); *G06T 2207/10024* (2013.01); *G06T 2207/10044* (2013.01); *G06T 2207/20208* (2013.01); *G06T 2207/20221* (2013.01)

(58) Field of Classification Search
USPC ............... 348/222.1–225.1, 229.1, 230.1
See application file for complete search history.

(56) References Cited

U.S. PATENT DOCUMENTS

| 2006/0033823 A1* | 2/2006 | Okamura ................. 348/254 |
| 2008/0291289 A1* | 11/2008 | Kurane .................. 348/222.1 |
| 2009/0153699 A1* | 6/2009 | Satoh et al. ............. 348/229.1 |
| 2010/0053346 A1* | 3/2010 | Mitsunaga ............... 348/208.6 |
| 2011/0090361 A1* | 4/2011 | Kobayashi et al. ....... 348/222.1 |

FOREIGN PATENT DOCUMENTS

| JP | 06-273354 | 9/1994 |
| JP | 2010-245998 | 10/2010 |

* cited by examiner

*Primary Examiner* — Twyler Haskins
*Assistant Examiner* — Dwight C Tejano
(74) *Attorney, Agent, or Firm* — Cowan, Liebowitz & Latman, P.C.

(57) ABSTRACT

An image pickup apparatus which is capable of accurately compensating for noise even when images are continuously taken at varying exposures. First and second image signals corresponding to the first and second exposures are output. The first and second image signals are subjected to a noise compensation process and then synthesized together to obtain a composite image signal. Data obtained in the first and second image signals when the noise compensation process was carried out on the first and second image signal is inherited, and a noise compensation process on the next first and second signals is carried out based on the data.

10 Claims, 6 Drawing Sheets

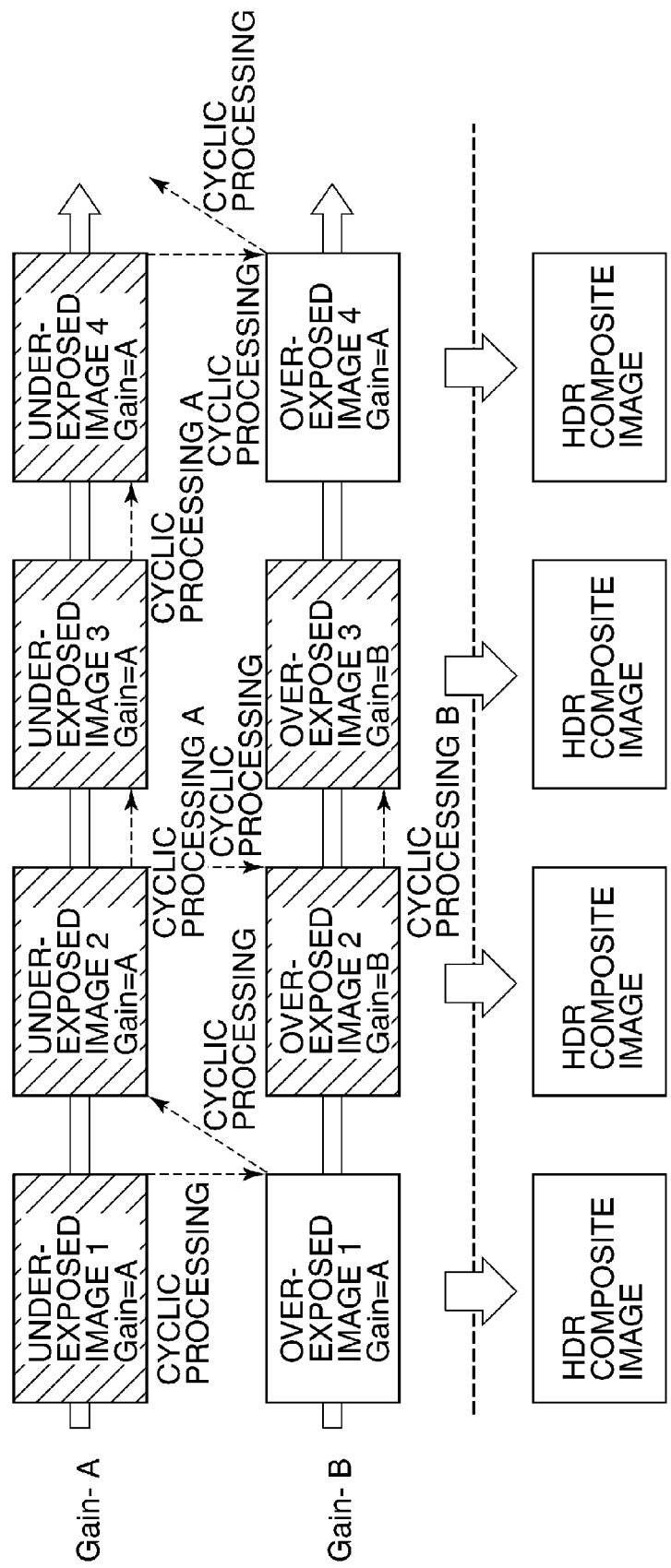

IMAGE PICKUP APPARATUS THAT CARRIES OUT NOISE COMPENSATION, CONTROL METHOD THEREFOR, AND STORAGE MEDIUM

BACKGROUND OF THE INVENTION

1. Field of the Invention

The present invention relates to an image pickup apparatus, a control method therefor, and a computer-readable storage medium storing a control program for implementing the method, and in particular to compensation control in taking moving images or still images while varying exposures.

2. Description of the Related Art

In recent years, image pickup apparatuses such as home video cameras and digital still cameras have become into widespread use among the general public. As image pickup devices used for the image pickup apparatuses, CMOS image pickup devices as well as CCD image pickup devices are used. These image pickup devices have been increasing in the number of pixels so as to meet market's (users') demands. With an increase in the number of pixels of the image pickup devices, the problem of noise generation caused by the image pickup devices themselves have been arising, and accordingly, various methods to reduce or compensate for noise have been proposed.

For example, there has been an image pickup apparatus which performs cyclic processing to compensate for or reduces noise generated during video shooting (see Japanese Laid-Open Patent Publication (Kokai) No. 2010-245998).

On the other hand, there has been known so-called shooting with expanded dynamic range (HDR shooting) which performs shooting with a dynamic range higher than a dynamic range of an image pickup device.

For example, there has been a method which expands dynamic range by synthesizing a so-called underexposed image and a so-called overexposed image together in an image pickup apparatus (see Japanese Laid-Open Patent Publication (Kokai) No. H06-273354). This HDR processing enables shooting with a dynamic range higher than a dynamic range of an image pickup device.

According to the noise compensation method described above, however, no consideration is given to a process in which exposures are purposefully changed like HDR shooting.

SUMMARY OF THE INVENTION

The present invention provides an image pickup apparatus capable of accurately compensating for noise even when images are continuously taken at varying exposures, a control method therefor, and a computer-readable storage medium storing a control program for implementing the method.

Accordingly, a first aspect of the present invention provides an image pickup apparatus having an image pickup device that obtains an image signal, comprising an exposure control unit configured to output first and second image signals corresponding to the first and second exposures differing from each other, a compensation processing unit configured to perform a noise compensation process on the first and second image signals, and a synthesizing unit configured to synthesize the first and second image signals subjected to the noise compensation process to obtain a composite image signal, wherein the compensation processing unit inherits data obtained in the first and second image signals when the noise compensation process was carried out on the first and second image signal, and carries out a noise compensation process on next first and second signals based on the data.

Accordingly, a second aspect of the present invention provides a control method for an image pickup apparatus having an image pickup device that obtains an image signal, comprising an exposure control step of outputting first and second image signals corresponding to the first and second exposures differing from each other, a compensation processing step of performing a noise compensation process on the first and second image signals, and a synthesizing step of synthesizing the first and second image signals subjected to the noise compensation process to obtain a composite image signal, wherein in the compensation processing step, data obtained in the first and second image signals when the noise compensation process was carried out on the first and second image signal is inherited, and a noise compensation process on next first and second signals is carried out based on the data.

Accordingly, a third aspect of the present invention provides a non-transitory computer-readable storage medium storing a control program for implementing a control method of controlling an image pickup apparatus having an image pickup device that obtains an image signal corresponding to an optical image obtained by shooting a subject, the control method comprising an exposure control step of outputting first and second image signals corresponding to the first and second exposures differing from each other, a compensation processing step of performing a noise compensation process on the first and second image signals, and a synthesizing step of synthesizing the first and second image signals subjected to the noise compensation process to obtain a composite image signal, wherein in the compensation processing step, data obtained in the first and second image signals when the noise compensation process was carried out on the first and second image signal is inherited, and a noise compensation process on next first and second signals is carried out based on the data.

According to the present invention, even when gain suddenly changes from one frame to another, noise can be accurately compensated for.

Further features of the present invention will become apparent from the following description of exemplary embodiments (with reference to the attached drawings).

BRIEF DESCRIPTION OF THE DRAWINGS

FIG. 7 is a diagram useful in explaining a cyclic noise compensation process carried out when gain is changed in the image pickup apparatus appearing in FIG. 1.

DESCRIPTION OF THE EMBODIMENTS

A description will now be given of an image pickup apparatus according to an embodiment of the present invention with reference to the drawings.

Figure 1:
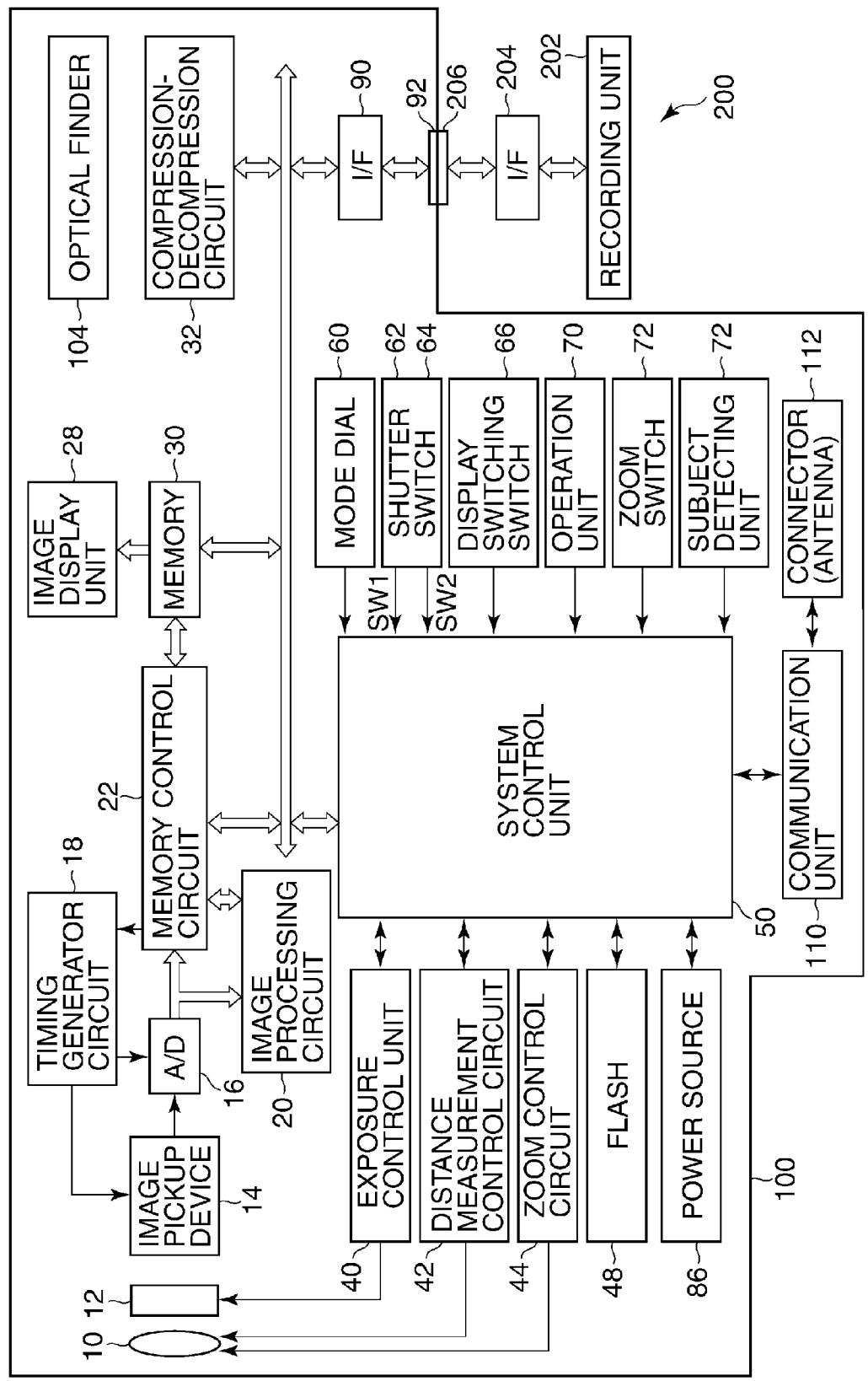
FIG. 1 is a block diagram schematically showing a digital camera which is an exemplary image pickup apparatus according to an embodiment of the present invention.

FIG. 1 is a block diagram schematically showing a digital camera which is an exemplary image pickup apparatus according to the embodiment of the present invention.

The image pickup apparatus 100 shown in the figure has a taking lens 10 and a mechanical shutter 12 having a diaphragm function. An optical image is formed on an image pickup device 14 through the taking lens 10 and the shutter 12. The image pickup device 14 outputs an electric signal (analog signal) corresponding to the optical image. The analog signal is converted into a digital signal (image data) by an A/D converter 16.

The image pickup device 14 and the A/D converter 16 are supplied with a clock signal and a control signal from a timing generator circuit (timing generator) 18, and the image pickup device 14 and the A/D converter 16 operate according to the clock signal and the control signal. The timing generator circuit 18 is controlled by a memory control circuit 22 and a system control circuit 50.

The timing generator circuit 18 controls the reset timing of the image pickup device 14, thereby controlling the time period for which charge is accumulated in the image pickup device 14. Namely, a so-called electronic shutter is realized by the timing generator circuit 18 controlling the reset timing.

An image processing circuit (image processing unit) 20 carries out predetermined image interpolation processing and color conversion processing on image data supplied from the A/D converter 16 or image data supplied from the memory control circuit 22. The image processing circuit 20 performs an electronic zooming function by clipping an image from the image data and zooming the image.

Further, the image processing circuit 20 carries out predetermined arithmetic processing according to image data obtained as a result of image pickup. The system control circuit (system control unit) 50 then controls an exposure control unit 40 and a distance measurement control unit 42 based on the arithmetic processing result. As a result, the exposure control unit 40 and the distance measurement control unit 42 carry out AF (auto-focus) processing, AE (auto-exposure) process, and EF processing using the so-called TTL (through-the-lens).

In addition, the image processing circuit 20 carries out AWB (auto white balance) processing using the TTL method based on an arithmetic processing result obtained by carrying out predetermined arithmetic processing according to image data obtained as a result of image pickup.

The memory control circuit 22 controls the A/D converter 16, the timing generator circuit 18, the image processing circuit 20, a memory 30, and a compression-decompression circuit 32. Image data output from the A/D converter 16 is written into the memory 30 through the image processing circuit 20 and the memory control circuit 22 or directly through the memory control circuit 22.

An image display unit 28 is comprised of, for example, a TFT LCD, and image data written into the memory 30 is displayed as an image on the image display unit 28 by the memory control circuit 22. The image display unit 28 can act as an electronic finder by displaying images in succession Further, display on the image display unit 28 is controlled to be turned on or off by the system control circuit 50. Turning off display on the image display unit 28 can significantly reduce power consumption by the image pickup apparatus 100.

Image data obtained as a result of image pickup is stored in the memory 30 as described above (the image data includes still image data and moving image data). The memory 30 has a storage capacity large enough to store a predetermined number of still images and moving image data for a predetermined time period.

As a result, even during so-called continuous shooting or panoramic shooting that continuously takes a plurality of still images, high-speed and high-volume image data can be written into the memory 30.

It should be noted that the memory 30 may be used as a work area for the system control circuit 50.

A nonvolatile memory 31 (not shown) is, for example, a flash ROM, and program codes to be executed by the system control circuit 50 are stored in the nonvolatile memory 31. The system control circuit 50 successively reads program codes from the nonvolatile memory 31 and executes them.

It should be noted that an area where system information is stored and an area where user setting information is stored are set in the nonvolatile memory 31, and the system control circuit 50 reads various information and settings at the time of next startup.

The compression-decompression circuit 32 compresses and decompresses image data through adaptive discrete cosine transform (ADCT) or the like. For example, the compression-decompression circuit 32 reads image data stored in the memory 30, carries out compression processing or decompression processing on the image data, and writes the processed image data into the memory 30.

The exposure control unit 40 controls the shutter 12 having the diaphragm function. The exposure control unit 40 also has a flash photometric function working in conjunction with a flash 48.

The distance measurement control unit 42 controls focusing of the taking lens 10. A zoom control unit 44 controls zooming of the taking lens 10. The flash 48 has an AF auxiliary light projecting function and a flash photometric function.

As described above, the exposure control unit 40 and the distance measurement control unit 42 are controlled using the TTL method, and based on arithmetic processing results obtained by the image processing circuit 20, the system control circuit 50 controls the exposure control unit 40 and the distance measurement control unit 42.

As shown in the figure, a mode dial switch 60, shutter switches 62 and 64, a display switching switch 66, an operation unit 70, and a zoom switch 72 are connected to the system control circuit 50.

The mode dial switch 60 is used for selectively setting functional modes such as power-off, automatic shooting mode, a shooting mode, a panoramic shooting mode, a video shooting mode, and an HDR (shooting with expanded dynamic range) video shooting mode.

The shutter switch 62 is turned on when a shutter switch (not shown) is depressed halfway, and sends out a first shutter switch signal SW1 to the system control circuit 50. As a result, the system control circuit 50 issues an instruction to start operation such as AF (auto-focus) processing, AE (auto-exposure) processing, or AWB (auto white balance) processing.

The shutter switch 64 is turned on when the shutter button is fully depressed, and sends a second shutter switch signal SW2 to the system control circuit 50. Thus, for example, in the case of flash photography, the system control circuit 50 carries out EF (flash pre-fire) processing and then exposes the image pickup device 14 to light for an exposure time period determined by AE processing.

In the case of flash photography, the flash 48 is fired during the exposure time period, and when the exposure time period has elapsed, the exposure control unit 40 shields light by controlling the shutter 12 under the control of the system control circuit 50, thus completing light exposure to the image pickup device 14.

As described above, an analog signal produced by digital-to-analog conversion and read from the image pickup device 14 is written as image data into the memory 30 through the A/D converter 16 and the memory control circuit 22 (reading process). Then, a developing process using arithmetic processing results obtained by the image processing circuit 20 and the memory control circuit 22 and a compression process in which the image data is read from the memory 30 and subjected to compression by the compression-decompression circuit 32 are carried out under the control of the system control circuit 50. Then, the compressed image data is written into a recording medium 200, to be described later (recording process).

Operation of the display switching switch 66 switches displays on the image display unit 28 under the control of the system control circuit 50. When the shooting is carried out using an optical finder 104, the switching of displays can shut off power supply to the image display unit 28 and save power as described earlier.

The operation unit 70 has, for example, various buttons, a touch panel, and a rotary dial. The various buttons include a menu button, a set button, a macro button, a multi-screen reproduction page break button, a flash setting button, a single shooting/continuous shooting/self timer switching button, and so on although they are not shown in the figure.

In addition, the various buttons include a menu go + (plus) button, a menu go − (minus) button, a reproduced image go + (plus) button, a reproduced image go − (minus) button, a shooting image quality selection button, an exposure compensation button, a date/time setting button, and so on.

The zoom switch 72 is operated by a user, and in response to operation of the zoom switch 72, the system control circuit 50 issues an instruction to change the magnification for an image to be taken. The zoom switch 72 has a telephoto switch that changes the shooting angle of view to a telephoto side and a wide switch that changes the shooting angle of view to a wide-angle side.

In response to operation of the zoom switch 72, the zoom control unit 44 changes the shooting angle of view for the taking lens 10 and performs optical zooming under the control of the system control circuit 50. Moreover, through operation of the zoom switch 72, electronic zooming such as changing of the shooting angle of view, for example, image clipping and pixel interpolation processing by the image processing circuit 20 is carried out.

A power source 86 is equipped with, for example, a primary battery such as an alkali battery, or a secondary battery such as a NiCd battery, a NiMH battery, or a Li ion battery, and also has an AC adapter.

An interface (I/F) 90 is an interface between the recording medium 200 such as a memory card or a hard disk and the image pickup apparatus 100, and is connected to the recording medium 200 by a connector 92.

The recording medium 200 has a recording unit 202 such as a semiconductor memory or a magnetic disk and an interface (I/F) 204, and is connected to the image pickup apparatus 100 by a connector 206.

A communication unit 110 has, for example, a USB, an IEEE1394 function, a LAN function, a wireless communication function, and so on. The communication unit 110 is connected to an external apparatus (not shown) by a connector 112. It should be noted that when the wireless communication function is used, an antenna is connected to the connector 112.

Figure 2:
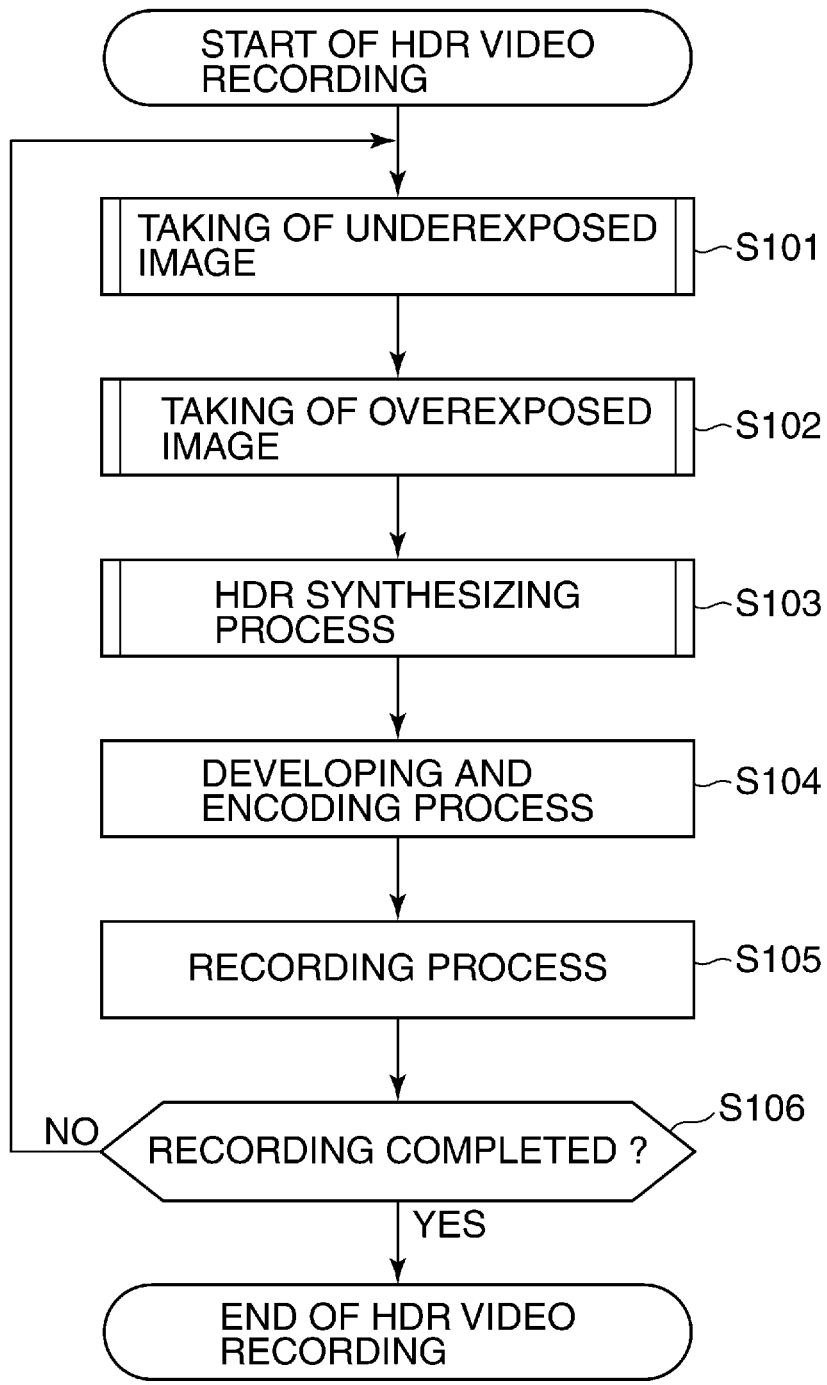
FIG. 2 is a flowchart useful in explaining how an HDR moving image is taken according to the present embodiment.

FIG. 2 is a flowchart useful in explaining HDR video shooting according to the present embodiment.

In HDR video shooting, two types of images are obtained with the dynamic range of the image pickup device 14 being set for under-/over-exposure, and these two types of images are synthesized together to expand the dynamic range.

When HDR video shooting is started, the system control circuit 50 obtains an image with low dynamic range (first image signal: hereafter referred to as the underexposed image) at a correct exposure (first exposure) (step S101). When the underexposed image is taken, the image is corrected by cyclic processing.

Then, the system control circuit 50 obtains an image with high dynamic range (second image signal: hereafter referred to as the overexposed image) at a second exposure (step S101). When the overexposed image is taken as well, the image is corrected by cyclic processing. A description will be given later of how the images are corrected by cyclic processing.

After the two types of images taken at different exposures are obtained (that is, after the underexposed image and the overexposed image are obtained), the image processing circuit 20 carries out a synthesizing process in which it synthesizes the two types of images together under the control of the system control circuit 50 to obtain composite image data (composite image signal) (step S103). A description will be given later of this synthesizing process.

After carrying out the synthesizing process, the image processing circuit 20 carries out a developing process in which it develops the composite image data in the form of a YUV signal and then carries out an encoding process (step S104). The image processing circuit 20 then causes the memory control circuit 22 to record image data, which has been obtained as a result of the encoding process, as moving image data on the recoding medium 200 (step S105).

The system control circuit 50 performs monitoring to check whether or not video shooting has been completed (step S106), and when video shooting is under way (NO in the step S106), the system control circuit 50 returns to the process in the step S101 in which it continues the HDR video recording.

On the other hand, when video shooting has been completed (YES in the step S106), the system control circuit 50 brings the HDR video recording to an end.

Next, a description will be given of image correction by cyclic processing (hereafter referred to as the cyclic noise compensation process), which is carried out in the present embodiment. In the present embodiment, it is assumed that row offset correction in which offsets are corrected on a row-by-row basis in the image pickup device 14 is performed. However, the method for the cyclic noise compensation process is not limited to this. A description will now be given of row offset correction.

Figure 3:
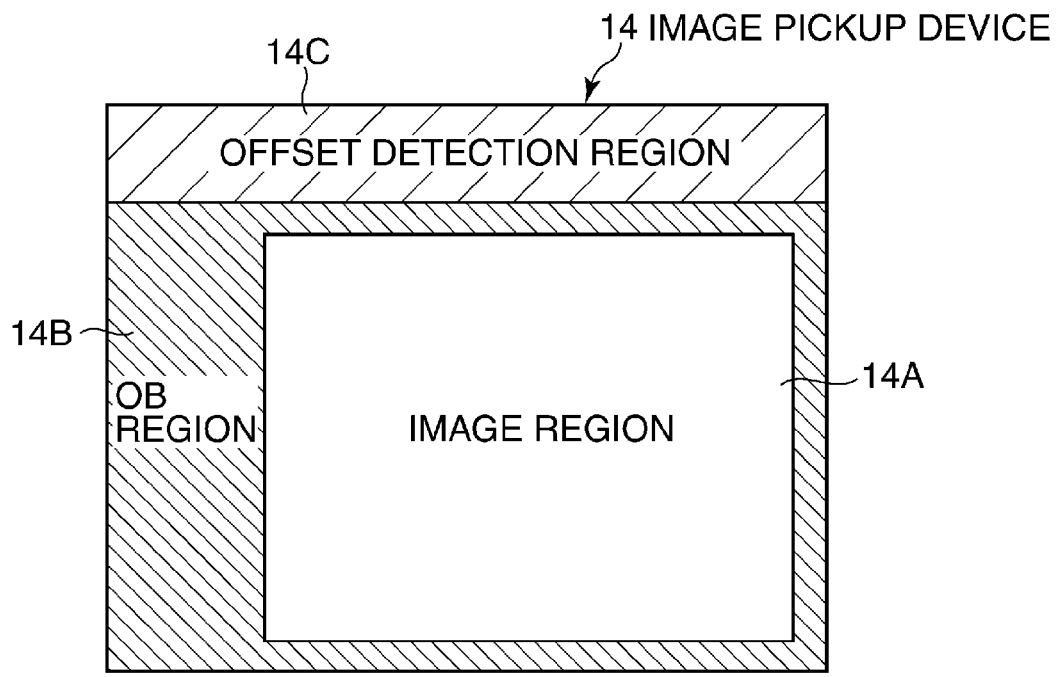
FIG. 3 is a view schematically showing a structure of an image pickup device.

FIG. 3 is a view schematically showing a structure of the image pickup device 14.

In the image pickup device 14, a plurality of pixels are arranged in a two-dimensional matrix, and an imaging area (surface) of the image pickup device 14 is divided into a plurality of regions.

In the example shown in the figure, the image pickup device 14 has an image region 14A which is an effective pixel region (a region where an image is effective), and an OB region 14B which outputs black level all the time is located around the image region 14A. In an upper part of the image pickup device 14, a row offset detection region 14C is defined. In the row offset detection region 14C, row offset detection is performed by cyclic processing on a row-by-row basis, and based on the detection results, the amount of offset correction is obtained.

In the row offset correction, the amount of offset correction varies from row to row, and hence a capacity corresponding to the number of horizontal pixels in the image pickup device 14 is required so as to store offset correction amounts. For example, when the number of pixels in a horizontal direction is N (N is an integer not less than 2), memory for cyclic data Offset [1] to Offset [N] is required.

First, at the time of starting to record moving image data, it is necessary to initialize cyclic data, and thus 0 is substituted in Offset [1] to Offset [N].

In cyclic row offset correction, cyclic data is obtained by multiplying an input pixel Pix [x, y] by a cyclic coefficient $\alpha$. Namely, the amount of offset correction is obtained using a formula (1) below.

$$\text{Offset}[x]=(\text{Pix}[x,y]-\text{setup})\times\alpha+\text{Offset}[x]\times(1-\alpha) \qquad (1)$$

Here, [x, y] designates the coordinates of a pixel, setup designates a fixed offset amount which is a black level, and $\alpha$ designates a cyclic coefficient ($0 \leq \alpha \leq 1.0$).

Cyclic processing for one line is carried out by performing the computation expressed by the formula (1) from the first pixel to the Nth pixel on the first line in the offset detection region 14C. Similarly, for the second line in the offset detection region 14C as well, the computation expressed by the formula (1) is performed from the first pixel to the Nth pixel. Then, cyclic computations are performed with respect to all the lines in the offset detection region 14C.

The larger the number of lines to be sampled, the higher the detection accuracy of the cyclic computations, and hence the larger the number of lines in the offset detection region 14C, the higher the detection accuracy.

In a region (image region) below the offset detection region 14C, row offset correction is performed using a formula (2) below in which the amount of offset correction obtained by the cyclic computations is subtracted.

$$\text{PixOut}[x,y]=\text{PixIn}[x,y]-\text{Offset}[x] \qquad (2)$$

Here, PixOut[x] designates an output after correction, and PixIn[x] designates an input before correction. Offset[x] designates the amount of offset correction.

By performing the offset correction expressed by the equation (2) over the image area 14A, image data from which offset components have been removed on a row-by-row basis can be obtained.

In the offset correction described above, cyclic processing is performed with respect to each frame in moving image data, and hence a default value of cyclic data Offset [x] in the next frame is final cyclic data of the previous frame. As a result, as the number of frames increases, the accuracy of offset detection increases, so that erroneous corrections can be reduced.

However, the amount of offset correction varies according to gain, and hence when gain changes, it takes some time before the amount of offset correction converges. Here, a description will be given of the cyclic noise compensation process effective against a change in gain during HDR shooting.

Figure 4:
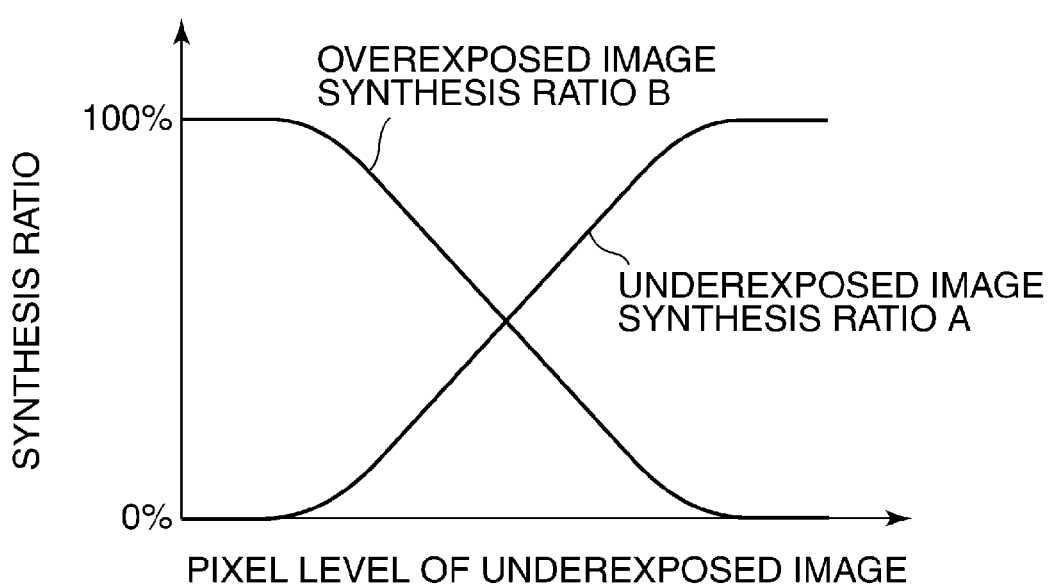
FIG. 4 is a view showing an exemplary synthesis ratio table for use in generation of an HDR image according to the present embodiment.

FIG. 4 is a view showing an exemplary synthesis ratio table for use in generation of HDR images according to the present embodiment.

In FIG. 4, the vertical axis represents synthesis ratio, and the horizontal axis represents pixel level of an underexposed image. An underexposed image synthesis ratio A and an overexposed image synthesis ratio B vary according to the pixel level of the underexposed image. It should be noted that this synthesis ratio table is, for example, stored in the nonvolatile memory 31, read by the system control circuit 50, and supplied to the image processing circuit 20 via the memory control circuit 22.

As described earlier, two types of images consisting of an underexposed image and an overexposed image are obtained by HDR shooting. The image processing circuit 20 refers to the underexposed image and obtains its synthesis ratio. Namely, according to levels of respective pixels in the underexposed image, the image processing circuit 20 refers to the synthesis ratio table shown in FIG. 4 to determine the synthesis ratio of each pixel. Then, the image processing circuit 20 carries out an image synthesizing process in which it synthesizes the two types of images using a formula (3).

$$\text{PixOut}[x,y]=\text{PixUnder}[x,y]\times A+\text{PixOver}[x,y]\times B \qquad (3)$$

Here, PixOut[x, y] designates an output after synthesis, and PixUnder[x, y] designates an underexposed image. PixOver [x, y] designates an overexposed image. A designates an underexposed image synthesis ratio, and B designates an overexposed image synthesis ratio.

As described above, the underexposed image synthesis ratio A and the overexposed image synthesis ratio B are determined by the pixel level of the underexposed image. When the pixel level of the underexposed image is low, the corresponding pixel has an extremely low brightness level, and hence the overexposed image synthesis ratio B is high, and the underexposed image synthesis ratio A is low.

On the other hand, when the pixel level of the underexposed image is high, the corresponding pixel has an extremely high brightness level, and hence the overexposed image synthesis ratio A is high, and the underexposed image synthesis ratio B is low.

By synthesizing two types of images (a first image signal and a second image signal) together as described above, image data with a wider dynamic range can be obtained as compared to image data obtained by one exposure.

A description will now be given of a conventional cyclic noise compensation process so as to facilitate the understanding of the cyclic noise compensation process according to the present embodiment.

In the conventional cyclic noise compensation process as one described in Japanese Laid-Open Patent Publication (Kokai) No. 2010-245998, it is preferred that gain does not suddenly change in continuous shooting such as video shooting. This is because noise generation patterns depend on gains, and namely, in cyclic processing in which the previous frame is referred to, correction accuracy deteriorates when gain changes. Also, a sudden change in gain makes moving images look less smooth. For this reason, during normal video shooting and recording, gain is not suddenly changed between successive frames.

Here, during HDR shooting, exposures are changed by adjusting shutter speed or gain with an aperture fixed because shooting is required to be performed without changing the depth of field.

When a subject is relatively bright, there is a high degree of flexibility in selecting shutter speed, and hence varying exposures can be realized merely by changing shutter speed with an aperture fixed without changing gain. However, when a subject is dark, shutter speed is slowed, and hence varying exposures may not be realized merely by adjusting shutter speed. In this case, it is necessary to increase exposure by raising readout gain.

To obtain the effects of HDR shooting, a difference of at least 3 levels to 4 levels between underexposure and overexposure is generally required. Namely, when an exposure difference cannot be realized by adjusting shutter speed, it is necessary to realize a difference of 3 levels to 4 levels by adjusting gain. This problem may arise even in a case where a desired exposure difference cannot be realized merely by changing shutter speed so as to reduce differences in the amount of blur of a subject between images due to a big motion of the subject.

When an exposure difference is realized by adjusting gain as described above, gain may greatly vary between successive frames.

For example, assume that an underexposed image is taken at Gain-A or a gain within a predetermined range from Gain-A, and an overexposed image is taken at Gain-B different from Gain-A or a gain within a predetermined range from Gain-B. It should be noted that in the present embodiment, it is assumed that the above predetermined ranges are smaller than a difference between Gain-A and Gain-B. On this occasion, if cyclic data in the previous frame is inherited, there may be a case where cyclic processing cannot be performed with a correct default value in the present frame because gain greatly varies as described above. For this reason, correction accuracy deteriorates in the conventional cyclic noise compensation process.

Figure 5:
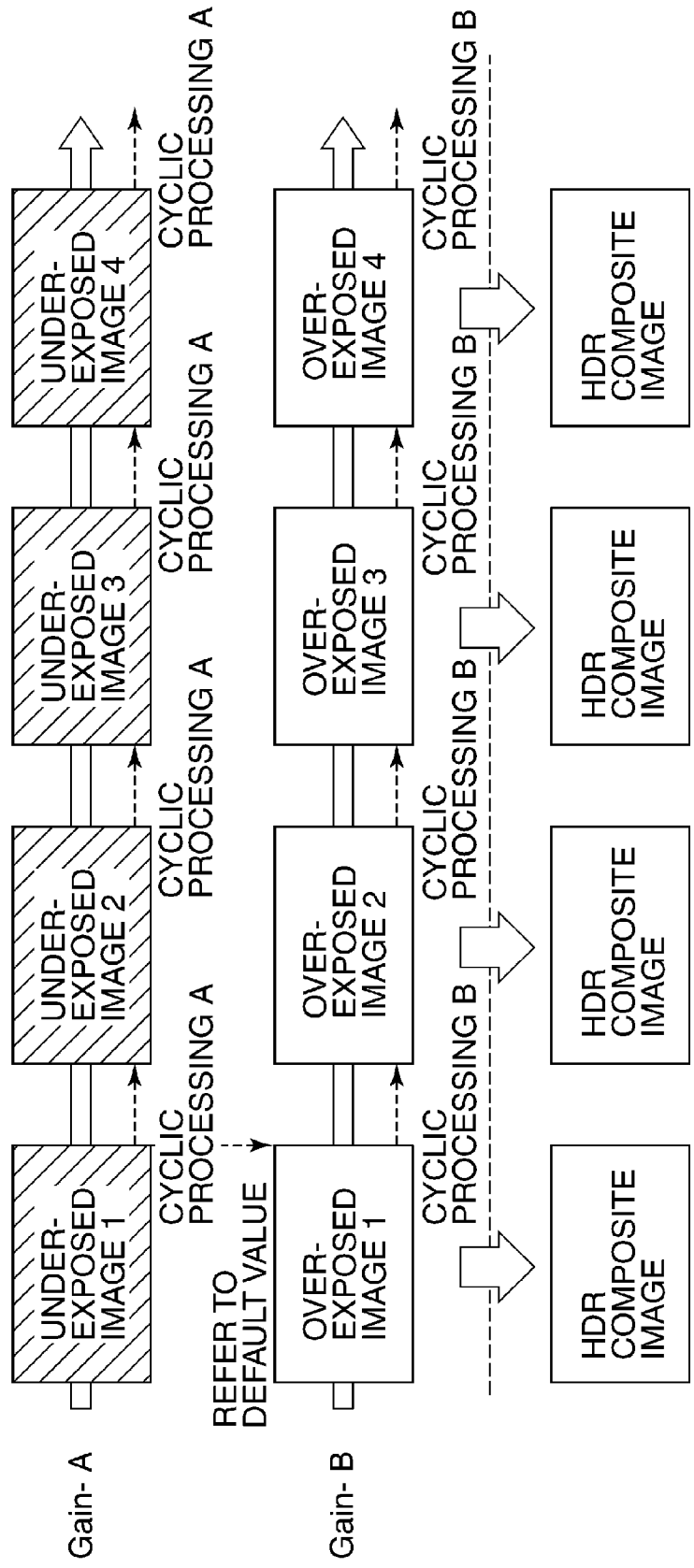
FIG. 5 is a diagram useful in explaining a cyclic noise compensation process carried out by the image pickup apparatus appearing in FIG. 1.

Accordingly, in the present embodiment, cyclic default values differing between an underexposed image and an overexposed image are prepared, and cyclic processing is performed separately on the underexposed image and the overexposed image FIG. 5 is a diagram useful in explaining the cyclic noise compensation process according to the present embodiment.

Now, underexposed images are taken at Gain-A or gains within a predetermined range from Gain-A, and overexposed images are taken with Gain-B or gains within a predetermined range from Gain-B. Because an "underexposed image 1" is an image taken first, a default value is 0, and offset detection is started by cyclic processing on the offset detection region 14C with Offset[x] being equal to 0. According to the amount of offset correction obtained by this offset detection, correction is performed for the image region 14A.

When taking of the "underexposed image 1", offset detection, and offset correction have been completed, then taking of an "overexposed image 1", offset detection, and offset correction are performed in this order.

Because as described above, gain differs between taking of an "underexposed image" and taking of an "overexposed image", cyclic data is not basically inherited from an "underexposed image" to an "overexposed image" in the next frame. Also, cyclic data is not inherited from an "overexposed image" to an "underexposed image" in the next frame. Namely, cyclic data is inherited from an "underexposed image" to an "underexposed image", and cyclic data is inherited from an "overexposed image" to an "overexposed image".

However, concerning a cyclic default value, cyclic data in the immediately preceding frame is used. Namely, under the control of the system control circuit 50, the image processing circuit 20 corrects cyclic data of the "underexposed image 1" using a conversion formula (4) to obtain a cyclic default value to be used for the "overexposed image 1".

$$\text{OffsetOver}[x] = \text{OffsetUnder}[x] \times 2^{\text{GainDiff}} \quad (4)$$

Here, OffsetOver[x] designates a cyclic default value for the overexposed image 1, and OffsetUnder[x] designates cyclic data of the immediately preceding underexposed image 1. GainDiff designates a gain difference (the number of levels) between taking of an underexposed image and taking of an overexposed image.

By using a cyclic default value obtained using the conversion formula (4), cyclic computations can be converged more quickly than in a case where cyclic processing is started with a cyclic default value of 0. Here, OffsetUnder[x] is cyclic data of the "underexposed image 1", and OffsetOver[x] obtained by the formula (4) is used as a cyclic default value for the "overexposed image 1". Then, under the control of the system control circuit 50, the image processing circuit 20 performs offset detection and offset correction for the "overexposed image 1".

Then, an "underexposed image 2" is taken. Cyclic data concerned with the "underexposed image 2" is not cyclic data of the "overexposed image 1" taken immediately before, but the image processing circuit 20 refers to the cyclic data of the "underexposed image 1" taken at the same gain.

Because in taking of the "underexposed image 1" and taking of the "underexposed image 2", gain is the same or within a predetermined range, cyclic data can be correctly inherited for the "underexposed image 2". Thus, offset detection can be accurately performed for the "underexposed image 2".

Likewise, a cyclic default value for the "underexposed image 2" is also inherited from the cyclic data of the "underexposed image 1". In this way, for an underexposed image, cyclic data is inherited only from an underexposed image, and cyclic processing A is performed. On the other hand, for an overexposed image, cyclic data is inherited only from an overexposed image, and cyclic processing B is performed. As a result, offset detection and offset correction can be accurately performed on images taken at different gains.

The cyclic noise compensation process described with reference to FIG. 5 is suitable for a case where noise detection and correction are performed by continuously taking pictures as with HDR shooting. On the other hand, cross-reference cyclic noise compensation described hereafter is useful in a case where the interval between shootings is long as with interval shooting.

Figure 6:
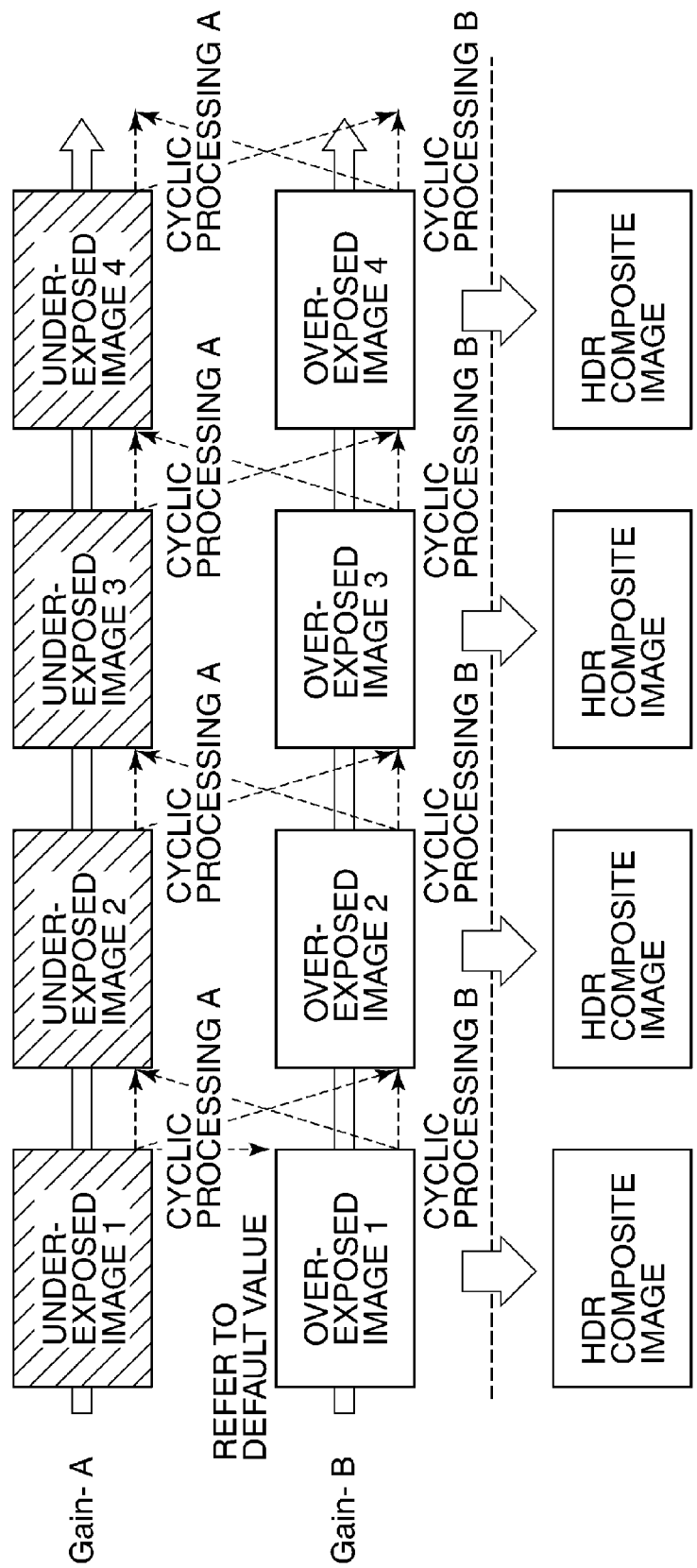
FIG. 6 is a diagram useful in explaining a cross-reference cyclic noise compensation process carried out by the image pickup apparatus appearing in FIG. 1.

FIG. 6 is a diagram useful in explaining a cross-reference cyclic noise compensation process carried out by the image pickup apparatus appearing in FIG. 1.

The amount of offset to be corrected for image pickup device 14 appearing in FIG. 1 varies with temperature change. When the time difference between frames is short as with moving image data, the effect of temperature change is relatively small.

On the other hand, when the interval between shootings is long as with interval shooting, temperature change of the image pickup device 14 during that time cannot be ignored. For this reason, referring to cyclic data of an image located closer in terms of time series can reduce the effect of temperature change and improve the accuracy of offset detection. Therefore, here, by referring to cyclic data of both an underexposed image and an overexposed image, the accuracy of offset detection with respect to temperature change of the image pickup device 14 is improved.

Also, in normal HDR video shooting as well, when the difference in gain applied to an underexposed image and an overexposed image becomes small, it is also useful to determine cyclic data for the present frame with consideration given to the immediately preceding frame.

Referring to FIG. 6, taking of an "underexposed image 1" and an "overexposed image 1", offset detection, and offset correction are performed in the way described above with reference to FIG. 5.

Regarding offset detection and offset correction for an "underexposed image 2", the image processing circuit 20 refers to cyclic data of the "underexposed image 1" and the "overexposed image 1" under the control of the system control circuit 50 when obtaining a cyclic default value. Then, the image processing circuit 20 determines cyclic data for the "underexposed image 2" based on a formula (5).

$$\text{OffsetUnder2}[x] = \text{OffsetUnder1}[x] \times \beta + \text{OffsetOver1}[x] \times 2^{\hat{}}\text{GainDiff} \times (1-\beta) \quad (5)$$

Here, OffsetUnder1[$x$] designates the underexposed image 1, and OffsetOver1[$x$] designates the immediately preceding overexposed image 1. GainDiff designates a gain difference (the number of levels) between taking of an underexposed image and taking of an overexposed image, and $\beta$ designates a cross-reference coefficient ($0 \leq \beta \leq 1.0$).

By using the formula (5), the cyclic default value for the "underexposed image 2" is determined (weighted) with consideration given to cyclic data of the "underexposed image 1" and cyclic data of the "overexposed image 1". As a result, a benefit can be obtained from the "underexposed image 2" being closer to taking of the "overexposed image 2" than to taking of the "underexposed image 1" in terms of time series.

It is preferred that the cross-reference coefficient $\beta$ is changed according to frame rate. Because the time difference between images (that is, between frames) decreases as frame rate increases, the image processing circuit 20 increases the degree to which cyclic data of images with the same gain is referred to. For this reason, the image processing circuit 20 brings the cross-reference coefficient $\beta$ close to 1.0 as frame rate increases.

On the other hand, as frame rate decreases, the image processing circuit 20 decreases the cross-reference coefficient $\beta$ from 1.0 so as to increase the degree to which cyclic data of images taken at different gains is referred to.

By referring to cyclic data of the "underexposed image 1" through the "underexposed image 4" and the "overexposed image 1" through the "overexposed image 4", and on this occasion, changing the cross-reference coefficient $\beta$ according to frame rate in the above described way, offset correction can be accurately performed.

It is also useful to change the cross-reference coefficient $\beta$ according to the gain difference GainDiff between an underexposed image and an overexposed image. In this case, it is thought that the smaller GainDiff, the more effectively the immediately preceding frame can be used, and therefore, the image processing circuit 20 decreases the cross-reference coefficient $\beta$ from 1.0 and brings it close to 0.

FIG. 7 is a diagram useful in explaining a cyclic noise compensation process carried out when gain is changed in the image pickup apparatus appearing in FIG. 1.

In the following description, it is assumed that at the time of shooting, for example, the brightness of a subject changes, and as a result, gain is changed irrespective of whether an image is an underexposed image or an overexposed image.

Referring to FIG. 7, an "underexposed image 1" through an "underexposed image 4", an "overexposed image 1", and an "overexposed image 4" are taken at a gain Gain-A, and an "overexposed image 2" and an "overexposed image 3" are taken at a gain Gain-B.

Because the "underexposed image 1", the "overexposed image 1", and the "underexposed image 2" are taken at the same gain Gain-A, the image processing circuit 20 performs offset correction on these images using cyclic data in the way described above with reference to FIG. 5 under the control of the system control circuit 50.

Namely, cyclic data of the "underexposed image 1" is inherited as a cyclic default value to the "overexposed image 1". Then, cyclic data of the "overexposed image 1" is inherited as a cyclic default value to the "underexposed image 2".

Because the "overexposed image 2" is taken at the different gain Gain-B, the image processing circuit 20 does not inherit cyclic data of the "underexposed image 2" as-is as a cyclic default value for the "overexposed image 2". Then, the image processing circuit 20 obtains a cyclic default value for the "overexposed image 2" according to a gain difference using a formula (6).

$$\text{OffsetOver2}[x] = \text{OffsetUnder1}[x] \times 2^{\hat{}}(\text{Gain}B - \text{Gain}A) \quad (6)$$

Here, OffsetOver2[$x$] designates a cyclic default value for the "overexposed image 2", and OffsetUnder1[$x$] designates cyclic data of the "underexposed image 1". GainA designates a gain at which the "underexposed image 2" is taken, and GainB designates a gain at which the "overexposed image 2" is taken.

Because the "underexposed image 3" and the "underexposed image 2" are taken at the same gain, the image processing circuit 20 inherits cyclic data of the "underexposed image 2" as a cyclic default value for the "underexposed image 3". Concerning the "overexposed image 3" as well, the image processing circuit 20 similarly inherits cyclic data of the "overexposed image 2" as a cyclic default value for the "overexposed image 3".

Further, because the "underexposed image 4" and the "underexposed image 3" are taken at the same gain, the image processing circuit 20 inherits cyclic data of the "underexposed image 3" as a cyclic default value for the "underexposed image 4".

Because the "overexposed image 4" and the "underexposed image 4" are taken at the same gain, the image processing circuit 20 inherits cyclic data of the "underexposed image 4" as a cyclic default value for the "overexposed image 4".

In the above described way, when gain is changed in the process of shooting, cyclic data of the last underexposed image or last overexposed image taken at the same gain is inherited as cyclic data for the present frame, and cyclic processing is performed.

As described above, according to the present embodiment, even when gain suddenly changes from one frame to another, offset correction (that is, noise compensation) can be accurately performed.

As is clear from the above description, in FIG. 1, the system control circuit 50 and the exposure control circuit 40 act as an exposure control unit. The image processing circuit 20 and the system control circuit 50 act as a compensation processing unit, a synthesizing unit, and a determination unit. The image processing circuit 20 acts as a weighting unit.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-184758 filed Aug. 26, 2011, which is hereby incorporated by reference herein in its entirety.

What is claimed is:

1. An image pickup apparatus having an image pickup device that obtains an image signal, comprising:
an exposure control unit configured to make the image pickup device output first and second image signals corresponding to the first and second exposures differing from each other;
a compensation processing unit configured to perform a noise compensation process on the first and second image signals; and
a synthesizing unit configured to synthesize the first and second image signals after the noise compensation process to obtain a composite image signal,
wherein said compensation processing unit inherits first data obtained in the first image signal when the noise compensation process was carried out on the first image signal, and carries out a noise compensation process on next first image signal based on the first data, and
wherein said compensation processing unit inherits second data obtained in the second image signal when the noise compensation process was carried out on the second image signal, and carries out a noise compensation process on next second image signal based on the second data,
wherein each of the first and second image signals has a plurality of successive frames,
wherein the image pickup apparatus further comprises a determination unit configured to, when gains of the first and second image signals differ, determine that the first data obtained in the previous frame of the first image signal is to be used for the noise compensation process for the next frame of the first image signal and the second data obtained in the previous frame of the second image signal is to be used for the noise compensation process for the next frame of the second image signal, and
wherein when gains of the first and second image signals are the same, said determination unit determines that data obtained by the noise compensation process on the previous frame of the first signal is to be used for the noise compensation process on the next frame of the second image signal, and data obtained by the noise compensation process on the previous frame of the second signal is to be used for the noise compensation process on the next frame of the first image signal.

2. An image pickup apparatus according to claim 1, wherein at the time of synthesizing the first and second image signals after the noise compensation process, said synthesizing unit synthesizes the first and second image signals based on a synthesis ratio determined according to a pixel level of the first image signal.

3. An image pickup apparatus according to claim 1, wherein at the time of carrying out the noise compensation process on the first frame of the second image signal, said determination unit determines that data obtained by converting data obtained in the first frame of the first image signal according to a gain difference between the first and second image signals.

4. An image pickup apparatus according to claim 3, wherein said determination unit further comprises a weighting unit that weights the gain difference and the data obtained in the first frame of the first image signal according to frame rates of the first and second image signals.

5. An image pickup apparatus according to claim 1, wherein the noise compensation process is cyclic type.

6. An image pickup apparatus according to claim 1, wherein said exposure control unit makes the image pickup device outputs the first and second image signals at respective predetermined cycles.

7. An image pickup apparatus according to claim 1, wherein the composite image signal is HDR image signal.

8. An image pickup apparatus according to claim 1, wherein the first and second exposures differ from each other in gain.

9. A control method for an image pickup apparatus having an image pickup device that obtains an image signal, comprising:
an exposure control step of making the image pickup device output first and second image signals corresponding to the first and second exposures differing from each other, wherein each of the first and second image signals has a plurality of successive frames;
a compensation processing step of performing a noise compensation process on the first and second image signals; and
a synthesizing step of synthesizing the first and second image signals after the noise compensation process to obtain a composite image signal,
wherein in said compensation processing step, first data obtained in the first image signal when the noise compensation process was carried out on the first image signal is inherited, and a noise compensation process on next first image signal is carried out based on the first data, and
wherein in said compensation processing step, second data obtained in the second image signal when the noise compensation process was carried out on the second image signal is inherited, and a noise compensation process on next second image signal is carried out based on the second data, and
a determination step of, when gains of the first and second image signals differ, determining that the first data obtained in the previous frame of the first image signal is to be used for the noise compensation process for the next frame of the first image signal and the second data obtained in the previous frame of the second image signal is to be used for the noise compensation process for the next frame of the second image signal, and, when gains of the first and second image signals are the same, determining that data obtained by the noise compensation process on the previous frame of the first signal is to be used for the noise compensation process on the next frame of the second image signal, and data obtained by the noise compensation process on the previous frame of the second signal is to be used for the noise compensation process on the next frame of the first image signal.

10. A non-transitory computer-readable storage medium storing a control program for implementing a control method of controlling an image pickup apparatus having an image pickup device that obtains an image signal corresponding to an optical image obtained by shooting a subject, the control method comprising:
an exposure control step of making the image pickup device output first and second image signals corresponding to the first and second exposures differing from each other, wherein each of the first and second image signals has a plurality of successive frames;
a compensation processing step of performing a noise compensation process on the first and second image signals; and
a synthesizing step of synthesizing the first and second image signals after the noise compensation process to obtain a composite image signal,
wherein in said compensation processing step, first data obtained in the first image signal when the noise compensation process was carried out on the first image signal is inherited, and a noise compensation process on next first image signal is carried out based on the first data, and
wherein in said compensation processing step, second data obtained in the second image signal when the noise compensation process was carried out on the second image signal is inherited, and a noise compensation process on next second image signal is carried out based on the second data, and
a determination step of, when gains of the first and second image signals differ, determining that the first data obtained in the previous frame of the first image signal is to be used for the noise compensation process for the next frame of the first image signal and the second data obtained in the previous frame of the second image signal is to be used for the noise compensation process for the next frame of the second image signal, and, when gains of the first and second image signals are the same, determining that data obtained by the noise compensation process on the previous frame of the first signal is to be used for the noise compensation process on the next frame of the second image signal, and data obtained by the noise compensation process on the previous frame of the second signal is to be used for the noise compensation process on the next frame of the first image signal.

* * * * *